(12) United States Patent
Serrano Solsona et al.

(10) Patent No.: US 10,009,279 B2
(45) Date of Patent: Jun. 26, 2018

(54) CONTENT COMPRESSION IN MOBILE NETWORK

(71) Applicant: VODAFONE IP LICENSING LIMITED, Newbury, Berkshire (GB)

(72) Inventors: Clara Serrano Solsona, Madrid (ES); Santiago Tenorio Sanz, Madrid (ES); Cristina M Ayuso, Madrid (ES); Francisco Javier Dominguez Romero, Madrid (ES)

(73) Assignee: VODAFONE IP LICENSING LIMITED, Newbury, Berkshire (GB)

(*) Notice: Subject to any disclaimer, the term of this patent is extended or adjusted under 35 U.S.C. 154(b) by 28 days.

(21) Appl. No.: 14/921,936

(22) Filed: Oct. 23, 2015

(65) Prior Publication Data
US 2016/0127240 A1    May 5, 2016

(30) Foreign Application Priority Data
Oct. 30, 2014  (EP) ..................... 14382423

(51) Int. Cl.
*H04L 12/801* (2013.01)
*H04W 80/00* (2009.01)
(Continued)

(52) U.S. Cl.
CPC .............. *H04L 47/12* (2013.01); *H04L 69/04* (2013.01); *H04L 69/322* (2013.01);
(Continued)

(58) Field of Classification Search
CPC .. H04L 47/38; H04L 47/365; H04W 28/0242; H04W 28/0247; H04W 28/0268;
(Continued)

(56) References Cited

U.S. PATENT DOCUMENTS 7,386,723 B2 * 6/2008 Seada ................ H04L 63/0209
455/72
7,920,590 B2 * 4/2011 Le .......................... H04L 69/04
370/467
(Continued)

FOREIGN PATENT DOCUMENTS

EP    3016432 A1 * 5/2016 ............ H04L 47/12
WO   2004/008672 A2   1/2004
(Continued)

OTHER PUBLICATIONS https://web.archive.org/web/20130815065314/http://en.wikipedia.org/wiki/Data_compression_ratio Author: Wlkipedia Title:Data compression Ratio Date: Jun. 19, 2013.*
(Continued)

*Primary Examiner* — Redentor Pasia
*Assistant Examiner* — Peter Mak
(74) *Attorney, Agent, or Firm* — Workman Nydegger (57) ABSTRACT

There is provided a method of data over a radio interface in a radio communication network based on a protocol layers model, the model comprising an IP layer on which IP packets are handled, wherein before the transmission of a determined IP packet, the method comprises: determining whether the IP packet is compressible under a predetermined condition and. if the IP packet is compressible under the predetermined condition, performing a compression of the IP packet. There are also provided a user equipment (UE) and a node adapted to perform the steps of a method according to the invention.

12 Claims, 4 Drawing Sheets

(51) Int. Cl.
  *H04W 28/02* (2009.01)
  *H04W 28/06* (2009.01)
  *H04L 29/06* (2006.01)
  *H04L 29/08* (2006.01)

(52) U.S. Cl.
  CPC ........... *H04W 28/02* (2013.01); *H04W 28/06* (2013.01); *H04W 80/00* (2013.01)

(58) Field of Classification Search
  CPC ................. H04W 28/0273; H04W 28/06; H04W 52/286
  See application file for complete search history.

(56) References Cited

U.S. PATENT DOCUMENTS

| | | | | |
|---|---|---|---|---|
| 8,089,948 B2* | 1/2012 | Garudadri | ............... | H04L 29/06 370/229 |
| 8,145,833 B1* | 3/2012 | Duan | ............ | G06F 12/08 711/104 |
| 8,638,795 B2* | 1/2014 | Jackowski | .......... | H04L 47/2441 370/389 |
| 9,203,933 B1* | 12/2015 | Akhter | ................. | H04W 28/06 |
| 9,491,103 B2* | 11/2016 | Kanamarlapudi | ....... | H04L 47/22 |
| 2002/0049861 A1* | 4/2002 | Bunn | ...................... | H03M 7/30 709/247 |
| 2003/0123485 A1* | 7/2003 | Yi | ......................... | H04W 28/06 370/477 |
| 2004/0008650 A1* | 1/2004 | Le | .......................... | H04L 69/04 370/338 |
| 2004/0114634 A1* | 6/2004 | Liu | ....................... | H04L 63/045 370/521 |
| 2004/0125793 A1* | 7/2004 | Yi | ........................ | H04W 28/18 370/352 |
| 2005/0030940 A1* | 2/2005 | Abrol | ..................... | H04L 69/04 370/352 |
| 2007/0109156 A1* | 5/2007 | Fallon | ..................... | G06T 9/00 341/50 |
| 2008/0144505 A1* | 6/2008 | Isnardi | ................. | H04L 1/0083 370/235 |
| 2009/0011769 A1* | 1/2009 | Park | ................. | H04W 74/0866 455/450 |
| 2010/0128742 A1* | 5/2010 | Chun | ................. | H04L 12/1886 370/474 |
| 2011/0058474 A1* | 3/2011 | Nagapudi | ............. | H04L 45/745 370/235 |
| 2011/0154160 A1* | 6/2011 | Yurzola | ............... | G06F 11/1048 714/763 |
| 2012/0230177 A1* | 9/2012 | Froese | .................... | H04L 47/11 370/212 |
| 2012/0230212 A1* | 9/2012 | Kaplan | ............. | G06F 15/17312 370/252 |
| 2012/0324100 A1* | 12/2012 | Tomici | .................. | H04L 45/123 709/224 |
| 2013/0107895 A1* | 5/2013 | Wentink | .................. | H04L 69/04 370/477 |
| 2013/0263167 A1* | 10/2013 | Parthasarathy | ..... | H04L 41/5067 725/14 |
| 2014/0098745 A1* | 4/2014 | Balasubramanian | | H04W 72/005 370/328 |
| 2014/0115128 A1* | 4/2014 | Myrberg | ............... | G06F 9/5061 709/221 |
| 2014/0161036 A1* | 6/2014 | Venkatachalam Jayaraman | | H04L 69/04 370/328 |
| 2014/0269291 A1* | 9/2014 | Dwivedi | ........... | H04W 28/0289 370/232 |
| 2015/0249610 A1* | 9/2015 | Kanamarlapudi | ...... | H04L 47/22 370/230.1 |
| 2016/0157114 A1* | 6/2016 | Kalderen | ............... | H04W 24/08 370/252 |
| 2016/0191402 A1* | 6/2016 | Anderson | .......... | H04N 21/2402 370/236 |
| 2016/0295456 A1* | 10/2016 | Zhang | ..................... | H04L 67/02 |
| 2016/0337255 A1* | 11/2016 | Balasubramanian | ... | H04L 69/04 |

FOREIGN PATENT DOCUMENTS

| | | | | |
|---|---|---|---|---|
| WO | WO 2004008672 A2 * | 1/2004 | ............. | H04L 69/04 |
| WO | 2004054202 A1 | 6/2004 | | |
| WO | WO 2011122999 A1 * | 10/2011 | ............. | H04L 47/11 |

OTHER PUBLICATIONS https://tools.ietf.org/html/rfc1144#section-5.3 Author: V. Jacobson Title: Compressing TCP/IP Headers for Low-Speed Serial Links Date: Feb. 1990.*
https://tools.ietf.org/html/rfc1144, #section-5.3, Author: V. Jacobson, Title: Compressing TCP/IP Headers for Low-Speed Serial Links, Date: Feb. 1990.*
European Search Report for EP 14 38 2423 dated Mar. 5, 2015.
Examination Report issued in EP 14382423.3 dated Jun. 29, 2017.

* cited by examiner

CONTENT COMPRESSION IN MOBILE NETWORK

CROSS REFERENCE TO RELATED APPLICATIONS

This application claims benefit and priority to European Application Number EP 14382423.3, filed on Oct. 30, 2014, the entirety of which is incorporated herein by reference.

TECHNICAL FIELD OF THE INVENTION

The present invention relates to the transmission data packets over radio interfaces. Particularly, there is described a solution for the transmission IP data packets in a mobile telecommunications network environment.

BACKGROUND OF THE INVENTION

In current mobile telecommunication networks data exchange between a user equipment and a node of the mobile telecommunication network is normally performed without any compression through the radio network interface. Considering an OSI model protocol stack, images and videos are typically compressed in the application layer (mpg, jpg protocols) but the rest of the data, like web browsing, signaling traffic, etc. is typically sent raw; some of said data is highly redundant and may produce interferences and congestion in the radio network interface. In a scenario where a radio network interface presents a congestion situation and interferences, the throughput is low and the user equipment power consumption may increase, reducing the quality of user's experience.

In the state of the art there are several solutions for the compression of data. One of these solutions is the header compression protocol of the IETF standardization (Robust Header Compression (RoHC) protocol); this solution is oriented to streaming applications for which large overheads are excessive for wide area networks and wireless systems where bandwidth is scarce. It would be desirable to have a solution for the compression of as an alternative to the compression of only the headers.

Typically the content in HTTP and SMTP protocols are compressed in a high percentage in case of high congestion in the network, but this solution is mainly implemented at the switches or modems. There is a need for a solution which is implemented by a complete network system which does not depend on specific hardware. For example, documents U.S. Pat. No. 8,750,370B2 and U.S. Pat. No. 8,542,136B1 solve the problem of congestion by reducing the data size to be transmitted. Said solutions are related to detecting congestion by modems and switches in a fixed line. Besides, it would desirable to have a solution which is independent of the congestion situation.

Another solution based in the protocol HTTP is the SPDY protocol, which reduces the page-load time and improves security. This is achieved by multiplexing and prioritizing multiple Web-pages HTTP requests over a single TCP connection, and applying compression to headers and optionally to content as well. Security is applied via TLS (Transport Layer Security). This solution works on the data packets of the application layer using HTTP protocol, and the encryption via TLS does not allow compressing the information. It would be desirable to have a solution for the compression of traffic independently of the transport layer or application layer.

Other solution oriented to the radio network interface, which is implemented for some vendors of 3G RNC and terminals, is to agree a compression only in the Uplink for some messages sent from a terminal. This solution presents the problem of reducing the traffic in the Uplink and it only works with specific devices (user equipment and vendor of RNC). It would be desirable to have an alternative solution implemented for Uplink and Downlink for all the user equipment and 3G RNC of the radio network interface.

Due to the problems found in the state of the art, there is a need to solve the problem of the high redundant traffic of the uplink and downlink in the radio network interface, independently of the congestion situation in said interface or the data origin (application, transport or IP layer).

STATEMENT OF THE INVENTION

The present invention provides a solution for the aforementioned problems by a method for transmission of data over a radio interface according to claim 1, a system according to claim 10, a user equipment according to claim 11 and a node according to claim 12. All the features described in this specification (including the claims, description and drawings) and/or all the steps of the described method can be combined in any combination, with the exception of combinations of such mutually exclusive features and/or steps.

In particular, in a first aspect of the invention there is provided a method for transmission of data over a radio interface in a radio communication network based on a protocol layers model, the model comprising an IP layer on which IP packets are handled, wherein before the transmission of a determined IP packet, the method comprises:
  a. determining whether the IP packet is compressible under a predetermined condition,
  b. if the IP packet is compressible under said predetermined condition, performing a compression of the IP packet.

This solution reduces the data traffic to be transmitted in the radio network interface, independently of the protocol used in upper layers to the IP layer, given a protocol stack model comprising an IP layer. The link—uplink and downlink—is also made not relevant for the method as defined, since it would compress data either towards or from the network. Advantageously, by compressing the compressible traffic on the IP layer, the problem of redundance of the traffic is avoided in the radio network interface.

In an embodiment of the invention the predetermined condition is that the content in the IP data field of the IP packet is not previously compressed.

In this embodiment, it is advantageous to compress data on the IP data field which is not already compressed in previous layers since there already exist a saving in data traffic and also the integrity of the data recovered at the receiver is ensured.

In an embodiment of the invention the predetermined condition is that the IP data field of the IP packet is not previously encrypted.

Similarly to the previous embodiment, it is advantageous to compress data on the IP data field which is not already encrypted in previous layers since the data recovered at the receiver is ensured by applying for example a decryption key.

In an embodiment of the invention the predetermined condition is that the IP packet is compressible by default.

Advantageously, this embodiment allows selecting a compression mode for any packet independently of any condition.

In an embodiment of the invention, the method comprises an additional step after step a), being:
   a1. detecting a congestion status in the radio interface, the congestion status may be either
      positive if there is congestion in the radio interface, or
      negative if there is no congestion in the radio interface.

Advantageously, detection of congestion allows applying compression to reduce the traffic depending on the congestion situation.

In an embodiment of the invention, the compression in step b) further comprises:
   performing a lossy compression of the IP data packets, if the congestion status in the radio network interface is positive, and
   performing a lossless compression of the IP data packets, if the congestion status in the radio network interface is negative.

Advantageously, this embodiment adds the additional step of discriminating whether the compression should be lossless or lossy depending on the compression status. Furthermore, by performing lossy compression in case of congestion, the method allows reducing the traffic as much as possible in the radio network interface; this is favourable under severe congestion situations. Furthermore, when there is no congestion the method also reduces the traffic by compressing the data in the radio network interface allowing a good throughput but without losing information.

In an embodiment of the invention, an IP packet is deemed compressible if
   the IP data field of the IP packet is not previously compressed or encrypted and further
   an achievable compression ratio is greater than a threshold, the achievable compression ratio being defined by the ratio:
      uncompressed data size/compressed data size.

In an embodiment of the invention wherein an IP packet is compressible if
   the IP data field of the IP packet is not previously compressed or encrypted and further
   the congestion status is positive.

In an embodiment of the invention wherein an IP packet is compressible if
   the congestion status is negative and
   the IP data field of the IP packet is not previously compressed or encrypted.

Advantageously, these embodiments
   add the step of performing compression of the packet being conditional on determining whether compression is desirable or not and
   add the determination of the desirability of compression being done when a congestion is detected either positive or negative.

By defining the different alternatives, the method allows versatility in terms of different uses of the invention. In the case when a packet has a low compression ratio the method may not compress the packet and resources can be distributed to other functionalities; this may reduce the consumption of battery in the user equipment.

In an embodiment, there is provided a method for communication of data over a radio interface in a radio communication network based on a protocol layers model, the model comprising an IP layer on which IP packets are handled, comprising a method for transmission according to the invention and further comprising:

c. sending the IP packet,
d. receiving the IP packet from the radio interface, and
e. performing a decompression of the packet received if the received IP packet is compressed.

Advantageously, this method allows performing a complete communication between nodes in the radio network interface, for example between user equipment and eNodeB in an LTE radio access technology based network, both in uplink and downlink.

In a second aspect of the invention, there is defined a system comprising,
   one or more user equipments, adapted to send and receive IP data packets over a radio interface, and compress and decompress said IP data packets,
   one or more nodes in a radio communication network, adapted to send and receive said IP data packets over the radio interface, and compress and decompress said IP data packets,
characterized in that the system comprises means adapted to carry out the steps of a method according to the first and second aspect of the invention.

Advantageously, this system is adapted to perform a method according to the invention giving a solution and alternatives to the problems found in the state of the art.

In a third aspect of the invention, there is defined a user equipment comprising means adapted to perform the steps of a method according to the invention.

In a forth aspect of the invention, there is defined a node in a radio communication network comprising means adapted to perform the steps of a method according to the invention.

DESCRIPTION OF THE DRAWINGS

These and other characteristics and advantages of the invention will become clearly understood in view of the detailed description of the invention which becomes apparent from preferred embodiments of the invention, given just as an example and not being limited thereto, with reference to the drawings.

DETAILED DESCRIPTION OF THE INVENTION

Once the object of the invention has been outlined, specific non-limitative embodiments are described hereinafter.

The embodiments are referred to a method for communication of data over a radio interface in a radio communication network based on a protocol layers model, the model comprising an IP layer on which IP packets are handled.

Figure 1:
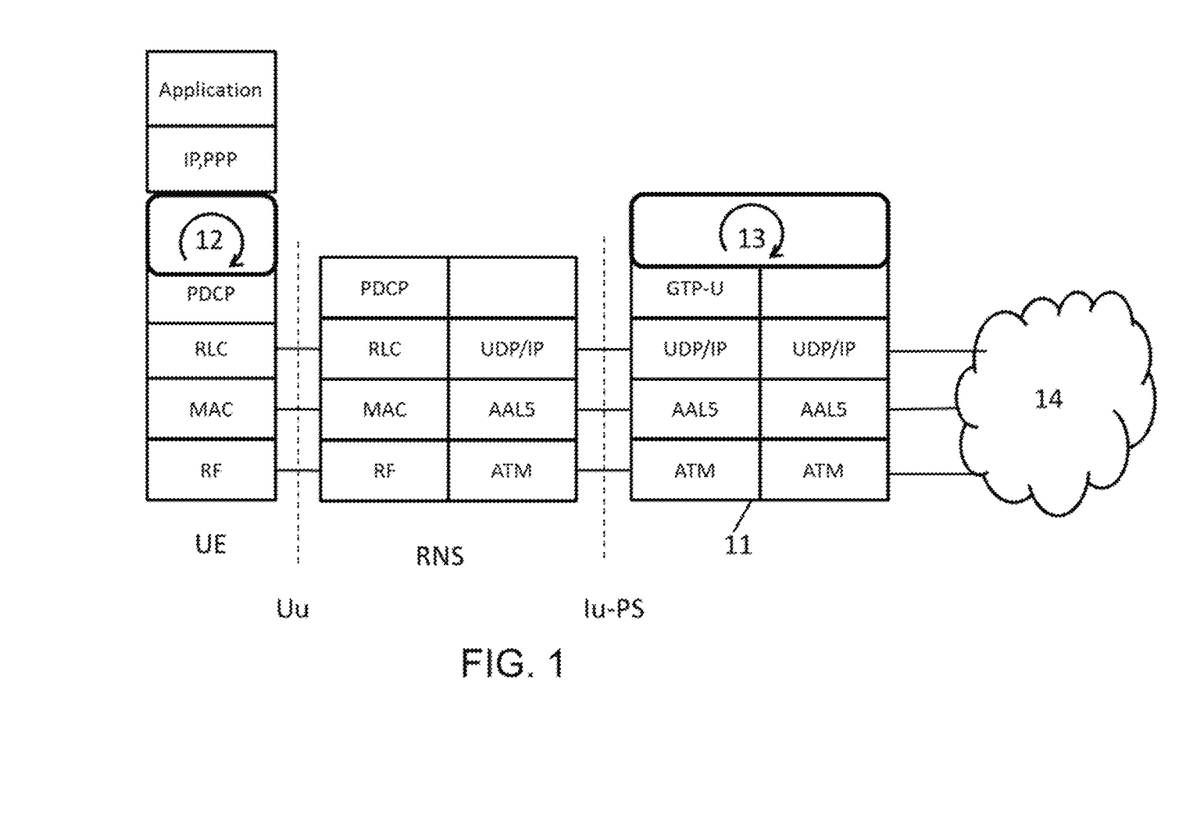
FIG. 1 This figure represents the protocol layer implementation of an embodiment of an OSI model where a method according to the invention may be performed.

FIG. 1 represents the protocol layer implementation of an embodiment of an OSI model where a method according to the invention may be performed. The method may be implemented in the IP layer providing the advantages described in this specification. The method allows compressing the compressible traffic transmitted over the radio interface in the IP layer in a communication network reducing the redundant data therein.

The decompression of the compressed packets received by the receiver, which may be a user equipment or a node in the network (14), may also be performed in the IP layer as it is shown in the FIG. 1, where the protocol layer implementation between elements such as:
  user equipment (UE),
  a radio network subsystem (RNS), and
  a new instance of a method according to the invention or new instance (11),
is represented. In a particular example, the new instance (11) may be completely integrated in the RNS. As it can be seen, the IP layer hosts the functionality of compressing (12) or decompressing (13) in a manner indicated by a method according to the invention. Therefore, according to the invention, the instances or elements adapted to perform the communication at IP level in a protocol layer model similar to the one represented in FIG. 1 may implement steps
  a. determining whether the IP packet is compressible under a predetermined condition,
  b. if the IP packet is compressible under said predetermined condition, performing
  a compression of the IP packet
before the transmission of the IP packet, both in the user equipment (UE) or a node in the network, in the case of FIG. 1 the node being the RNS.

The invention reduces the traffic size in the interface Iu-PS; advantageously in the case of failure in a RNS or eNodeB, in the LTE case, the data could be managed and redistributed to other RNS or eNodeB by a controller RNC without collapsing the interface, due to the low size of the data.

Figure 2A:
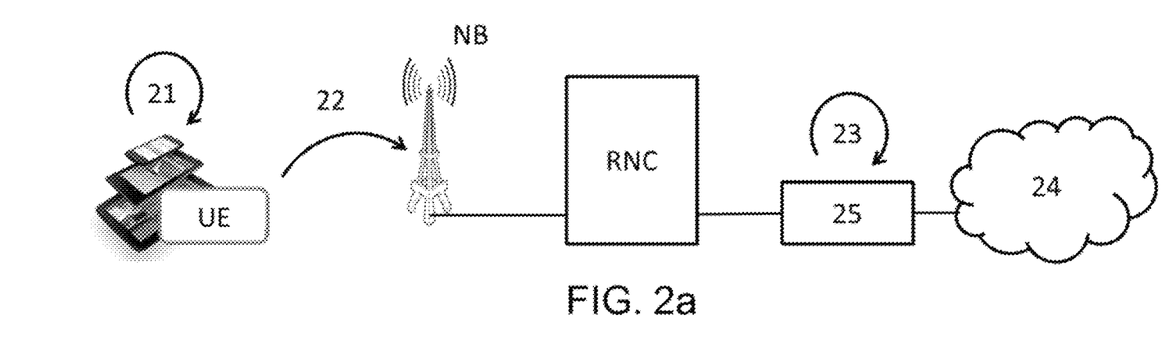
FIG. 2a This figure represents an embodiment of radio network interface wherein the method is implemented.
Figure 2B:
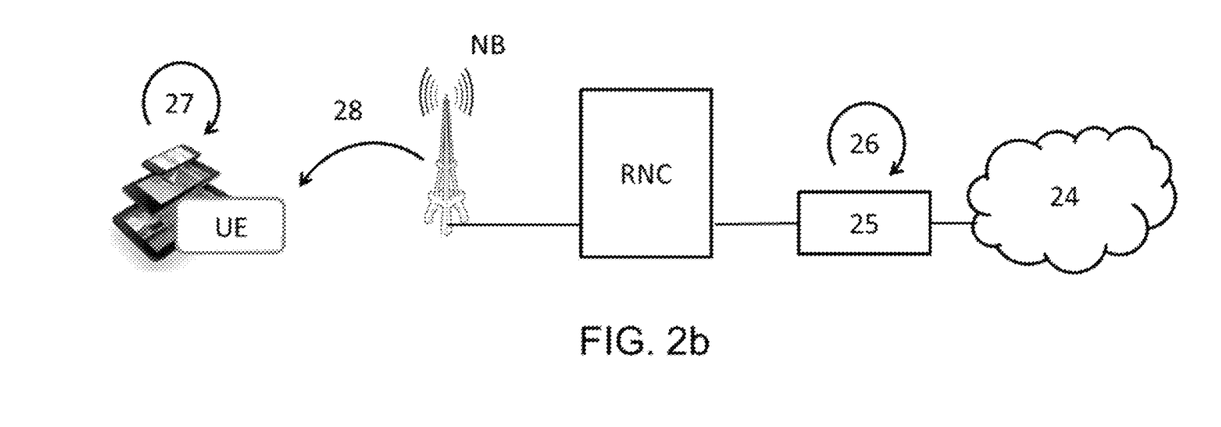
FIG. 2b This figure represents an embodiment of radio network interface wherein the method is implemented.

FIG. 2a and FIG. 2b represent an embodiment of radio network interface wherein the method is implemented. FIG. 2a represents the implementation of a method in the uplink and in FIG. 2b there is described the implementation in downlink.

In the embodiment represented in FIGS. 2a and 2b, the user equipment (UE) is a smartphone and the node in the radio communication network is a nodeB connected to a radio network controller (RNC).

The communication process in the uplink and the downlink is implemented as follows:

FIG. 2a—Uplink:

The data content is generated by the user equipment (UE), and then the user equipment detects the type of data. In the case where the data is compressible, the compression (21) is done by the user equipment at IP level. Next, all the data, either compressed or not, is transmitted (22) to a node (NB) in the radio communication network.

Then, NB receives the data and transmits the data to the RNC. In this embodiment, the decompression (23) is done in a new instance (25) connected to the RNC. In other embodiments this new instance (25) may be integrated in the RNC. Then the decompressed data is sent to the core network (24) in the telecommunication network.

FIG. 2b—Downlink:

The data is received from the core network (24) by the user equipment (UE). In this embodiment the possible compression (26) may be performed in the new instance (25). Then all the data compressed or not is transmitted (28) through a node in the radio communication network (NB) to the user equipment (UE).

Then, the user equipment receives the data and performs the decompression (27) of the compressed data, and the data content can be delivered to the user equipment (UE) (applications or other functionalities).

Optionally in an example, lossy compression may be applied only in case of radio congestion.

The detection of the radio congestion can be performed by either:
  the user equipment (UE): The congestion for uplink may be done based on a method for detection at a user equipment (UE); or
  the network: This may be done by the RNC (or eNB in LTE) or in the OSS system following nodes; subsequently the new instance (25) or internally the RNS may implement with the compression/decompression software for activating the lossy compression.

Figure 3:
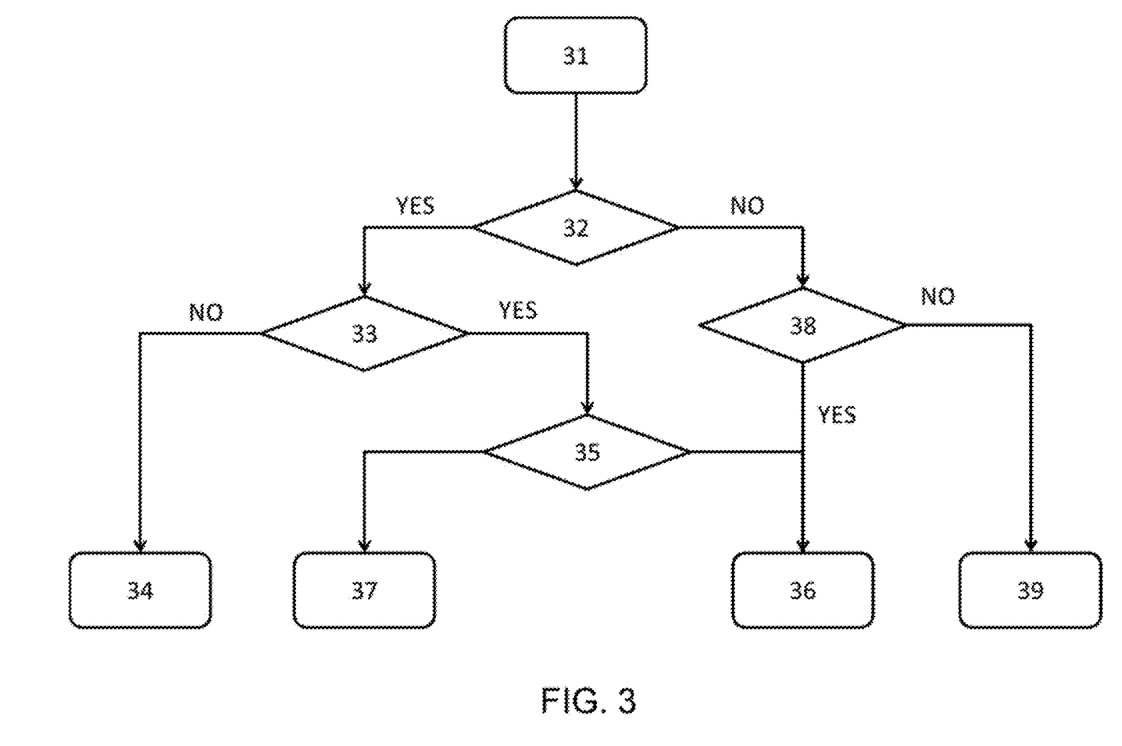
FIG. 3 This figure represents a flow chart of an embodiment of the method of the invention implemented by a transmitter.

In FIG. 3 there is shown a flow chart of an embodiment of the method of the invention implemented by a transmitter. Firstly a data packet is considered (31) at the IP layer; then method detects (32) whether a congestion status is either:
  positive, if there is congestion in the radio interface,
  or negative, if there is no congestion in the radio interface.

In some embodiments the detection of the radio congestion can be done in both links:
  Uplink: the congestion detection is performed in the user equipment, for example, by observing the throughput of is communication with the network.
  Downlink: the congestion detection is performed by the RNC (or eNodeB in LTE) or in the Operations Support Systems (OSS system). In this case, the detection congestion is based if an event activates a determined trigger:
  Checking the level of the radio power transmission (applicable to both 3G and LTE). For example if the radio power transmission is higher than a threshold, i.e. 80% of the total power available in the amplifier, the congestion status is positive.
  Checking the interface between a RNC and a node B (Iub) in 3G: a first trigger may be the delay between the packets from a RNC to the node B; If said delay is higher than a threshold, preferably higher than 5 milliseconds, the congestion status is positive. A second trigger in the Iub interface, may be that if the percentage of lost packets is higher than a threshold, preferably higher than 1%, then the congestion status is positive.
  Checking the amount of codes used in the 3G radio network. For example, if the radio user interface uses the High-Speed Packet Access (HSPA) technology, wherein the total available number of codes are 15, if the amount of codes used in the radio network interface is higher than a threshold, preferable higher than 13, the congestion status is positive.
  Checking the amount of physical resource blocks (PRBs) used in LTE. For example in a carrier of 20 MHz in LTE there is a 100 PRB, therefore if the PRB used are higher than 80, the congestion status is positive.
  Checking the baseband load of the NodeB/eNodeB is higher than a threshold. For example if the baseband load is higher than 70%, the congestion status is positive.

Congestion Status Positive

In the case when the congestion status is positive, a packet inspection is performed for determining (33) whether the IP packet is compressible under a predetermined condition. In various embodiments said conditions may be:
  the IP packet is not previously compressed,
  the IP packet is not previously encrypted,
  the IP packet is compressible by default.

If the IP packet is not compressible the packet is sent uncompressed (34).

In some embodiments, the IP packet is compressible:

If the content is encrypted, for example with protocols SPDY and HTTPS; then the packet may be sent to the next layer without any modifications. This is due to the fact that encrypted content may be already compressed.

If the content comprises third vendors who implement 3G RAN proprietary content compression solutions; then the packet may be sent to the next layer without any modifications.

If the content is not encrypted, an algorithm may calculate the potential compression ratio and if it is higher than a threshold, for example higher than a 5% of compression; then it may be considered for compression.

In an embodiment the compression ratio may be calculated as:

$$\text{ratio}(\%) = \frac{\text{size of the original data}}{\text{size of data } \textit{compresed}} \times 100$$

Afterwards, if the content is compressible, then the packet is compressed (35); for compressing the packet, there are 2 possibilities:

applying lossy compression (37) to the IP data packet and the transmitter sends the packet compressed. For example, if an image is transmitted, a reduction of the pixels or the size of the image, or the codec used for the image (jpg, bmp . . . ) can be applied.

when lossy compression (37) is not used, the lossless compression (36) is applied. After the lossless compression (36) is performed, the transmitter sends the packet compressed.

This is advantageous because in case of congestion the method transmits the minimum data as it is possible so that over congestion is avoided.

Congestion Status Negative

In the case of congestion status negative, a packet inspection may be performed to determine (38) whether the IP packet is compressible under a predetermined condition. If the content is compressible, a lossless compression (36) may be performed and the packet may be sent compressed by the transmitter, even when there is no congestion; in this case, although the throughput is not intended to be improved, the traffic in the backhaul network may be reduced.

If the content is not compressible the packet is sent uncompressed (39).

Reception of the Packet

After the transmission of the data is performed by the transmitter, the receiver may receive the IP packet from the radio interface, and, in case the received packet is compressed, decompresses the compressed packet.

In some embodiments, the transmitter is a smartphone and the receiver is a node B (uplink), and in other embodiments the transmitter is a node B and the receiver is a smartphone (downlink), being the method similar and applicable in both cases.

Figure 4:
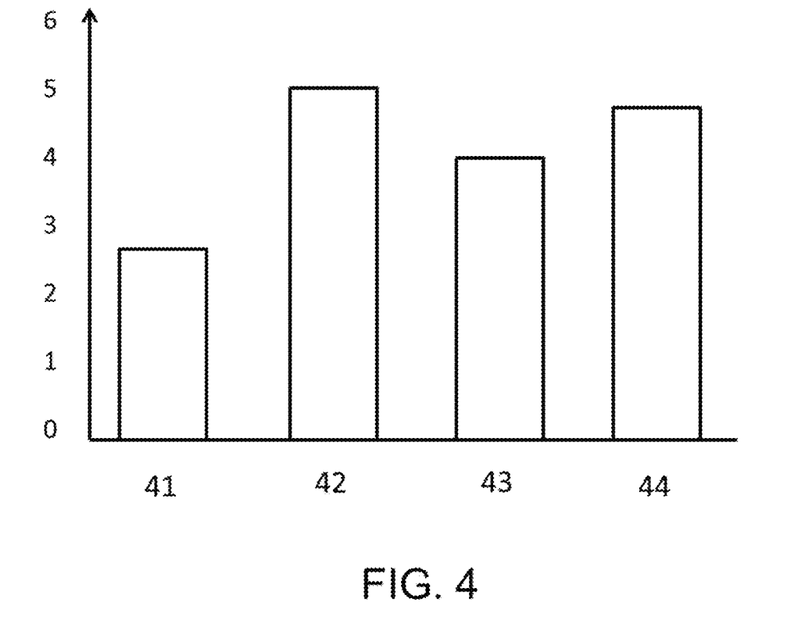
FIG. 4 This figure shows the compression ratio of data packets after using the method of the invention.

FIG. 4 shows the compression ratio of data packets after using the method of the invention. In the abscissa axis the type of data on which the method is applied is represented, and in the ordinate axis the achieved compression ratio is represented; the data of the FIG. 4 are shown in the table 1:

TABLE 1

| Type | compression ratio | Transmitted ratio (%) | Gain ratio (%) |
|---|---|---|---|
| Text 1 (41) | 2.7 | 37 | 63 |
| Text 2 (42) | 5 | 20 | 80 |
| Video (43) | 4 | 25 | 75 |
| Text and image (44) | 4.9 | 20.5 | 79.5 |

In an embodiment, the percentage of the data reduced is obtained from the following expression:

$$\text{gain ratio}(\%) = \left[1 - \frac{\text{size of data } \textit{compresed}}{\text{size of the original data}}\right] \times 100$$

As it is shown in the Table 1, the gain ratio of reduction of the transmitted data in the radio network interface is very high, due to that in the worst case it will reduce more than the 60% of the transmitted data, solving the problem of redundancy of traffic in the radio network interface.

The invention claimed is:

1. A method for transmission of data over a radio interface in a radio communication network based on a protocol layers model, the model comprising an IP layer on which IP packets are handled, wherein before the transmission of a determined IP packet, the method comprises:
   determining whether the IP packet is compressible under a predetermined condition;
   detecting a congestion status in the radio interface, the congestion status being either positive if there is congestion in the radio interface, or negative if there is no congestion in the radio interface; and
   if the IP packet is compressible under said predetermined condition, performing a compression of the IP packet at the IP layer,
   wherein performing a compression of the IP packet comprises:
      performing a lossy compression of the IP data packets, if the congestion status in the radio network interface is positive, and
      performing a lossless compression of the IP data packets, if the congestion status in the radio network interface is negative.

2. The method according to claim 1, where the predetermined condition is that the IP data field of the IP packet is not previously compressed.

3. The method according to claim 2, wherein an IP packet is compressible if
   the IP data field of the IP packet is not previously compressed and further
   an achievable compression ratio is greater than a threshold, the achievable compression ratio being defined by the ratio:
   uncompressed data size/compressed data size.

4. The method according to claim 1, where the predetermined condition is that the IP data field of the IP packet is not previously encrypted.

5. The method according to claim 4, wherein an IP packet is compressible if
   the IP data field of the IP packet is not previously encrypted and further
   an achievable compression ratio is greater than a threshold, the achievable compression ratio being defined by the ratio:
   uncompressed data size/compressed data size.

6. The method according to claim 1, where the predetermined condition is that the IP packet is compressible by default.

7. The method according to claim 1, wherein an IP packet is compressible if
   the IP data field of the IP packet is not previously compressed or encrypted and further
   the congestion status is positive.

8. The method according to claim 1, wherein an IP packet is compressible if
   the congestion status is negative and
   the IP data field of the IP packet is not previously compressed or encrypted.

9. The method according to claim 1, further comprising: sending the IP packet;
   receiving the IP packet from the radio interface; and
   performing a decompression of the packet received if the received IP packet is compressed.

10. A system comprising,
    one or more user equipments (UE), adapted to send and receive IP data packets over a radio interface, and compress and decompress said IP data packets at the IP layer;
    one or more nodes in a radio communication network, adapted to send and receive said IP data packets over the radio interface, and compress and decompress said IP data packets at the IP layer; and
    wherein the system comprises means adapted to carry out the steps of a method according to claim 1.

11. A user equipment (UE) comprising means adapted to perform the steps of a method according to claim 1.

12. A node in a radio communication network comprising means adapted to perform the steps of a method according to claim 1.

* * * * *